United States Patent [19]
Olsen et al.

[11] 4,173,200
[45] Nov. 6, 1979

[54] BIRDHOUSE CONSTRUCTION

[76] Inventors: Wayne A. Olsen, 250 Ewald SE., Salem, Oreg. 97302; Calvin L. Tigner, 1035 N. Albany Rd., Albany, Oreg. 97321

[21] Appl. No.: 859,332

[22] Filed: Dec. 12, 1977

[51] Int. Cl.² ............................................. A01K 31/00
[52] U.S. Cl. ...................................................... 119/23
[58] Field of Search ............. 119/23, 45 R; 229/52 A

[56] References Cited

U.S. PATENT DOCUMENTS

| 1,477,861 | 12/1923 | Allen | 119/45 R |
| 1,987,347 | 1/1935 | Moore | 119/23 |
| 2,645,406 | 7/1953 | Robins | 229/52 A |

Primary Examiner—Hugh R. Chamblee
Attorney, Agent, or Firm—James D. Givnan

[57] ABSTRACT

A birdhouse of cylindrical shape having circular end walls affixed in a detachable manner. Formed integrally with one of the end walls is a perch projecting outwardly from the end wall along a fold line. A perch support member is in abutting contact with the end wall and the perch. A retainer strip is struck from the end wall and the perch to confine the support member against dislodgment. A support strap for the birdhouse is provided with enlarged ends for inserted locking engagement with openings in each end wall.

3 Claims, 6 Drawing Figures

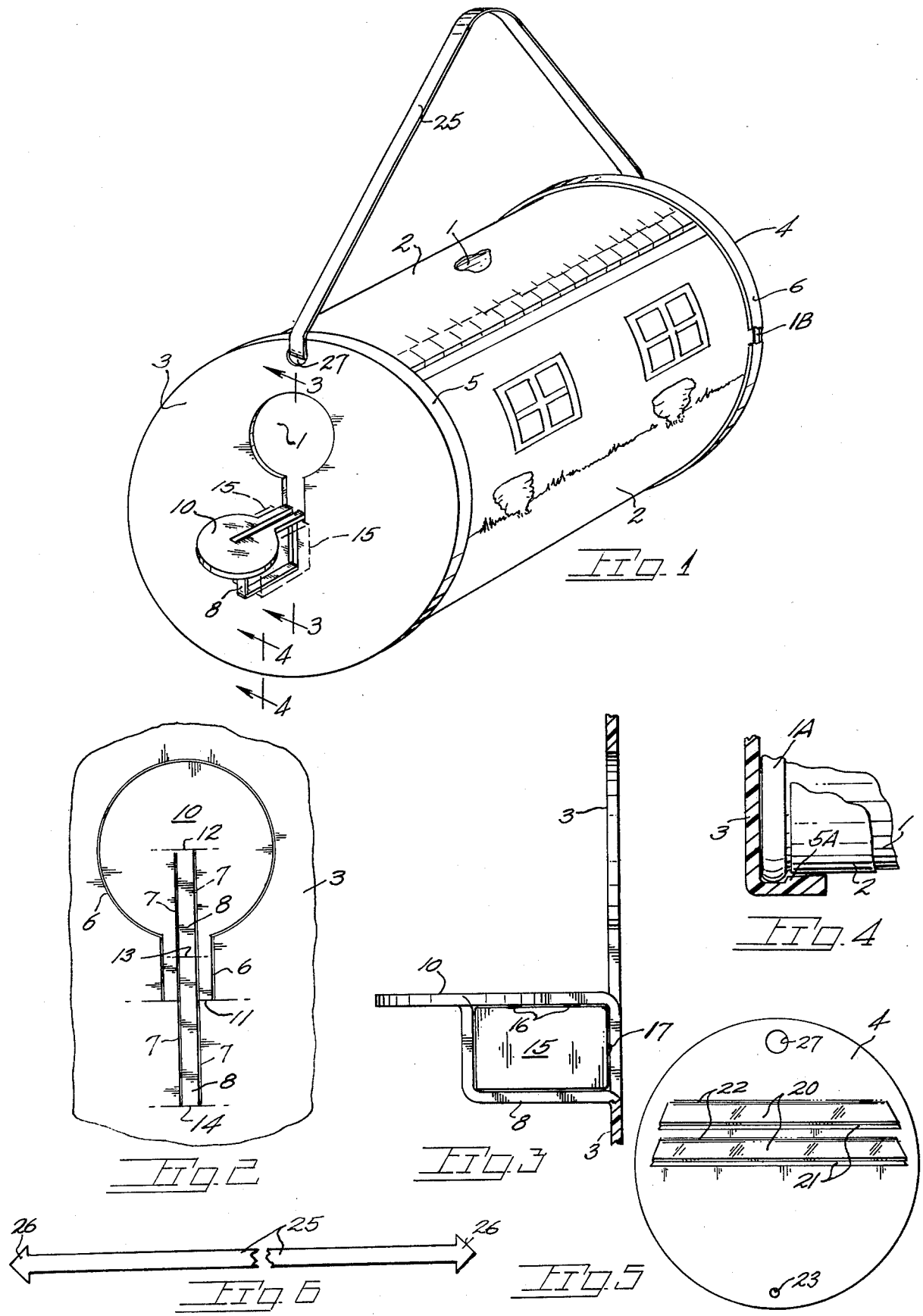

BIRDHOUSE CONSTRUCTION

BACKGROUND OF THE INVENTION

The present invention relates generally to birdhouses and particularly to birdhouse construction of cylindrical configuration with detachable end walls.

Conventional birdhouses are constructed from dimensioned wood components with each incurring substantial cost and requiring some degree of carpentry skill and equipment. Accordingly, individuals wishing to purchase same are sometimes deterred by the purchase price or effort necessary to build same. Additionally, conventional birdhouse construction requires, in most instances, a specific support, i.e., a pole, wall, fence post, etc.

SUMMARY OF THE PRESENT INVENTION

The present invention is embodied within a birdhouse of cylindrical shape closed at its ends by detachable end walls with one of said end walls having a perch formed integrally therewith.

The present birdhouse may utilize an emptied tin can to provide the cylindrical wall structure. The detachable end walls are in removable engagement with the cylindrical structure to permit access for periodic cleaning purposes. One end wall defines a passageway formed during a punching operation which operation results in the formation of a perch. A rectangular perch support member is insertable below the perch to retain the latter in perpendicular relationship with the birdhouse end wall. A pressure sensitive strip is affixable to the exterior of the cylindrical structure for esthetic purposes. A remaining end wall is configured so as to provide ventilation and a drain opening.

Important objects of the present invention include the provision of birdhouse construction utilizing a readily available, low cost structural member such as an emptied tin can; the provision of birdhouse construction having readily detachable end wall members with one of said end walls having a perch structure formed therefrom by a punching operation; the provision of a birdhouse structure wherein one end wall member is formed to provide both ventilation and drain openings; the provision of birdhouse construction wherein a perch support member retains the perch in perpendicular relationship to its integral end wall member; and a birdhouse supporting strap in inserted engagement with openings in the birdhouse end walls.

BRIEF DESCRIPTION OF THE DRAWING

In the accompanying drawing:

FIG. 1 is a perspective view of the present birdhouse construction;

FIG. 2 is a front elevational view of a fragment of an end wall after a punching operation;

FIG. 3 is a sectional view taken along line 3—3 of FIG. 1 showing details of the perch;

FIG. 4 is a sectional view taken along line 4—4 of FIG. 1 showing details of end wall and housing attachment;

FIG. 5 is a rear elevational view of FIG. 1 showing a rear end wall of the birdhouse construction; and FIG. 6 is a plan view of a strap by which the birdhouse may be supported.

DETAILED DESCRIPTION OF THE PREFERRED EMBODIMENT

With continuing attention to the accompanying drawing, the reference numeral 1 indicates a cylindrical, hollow structure to which is applied a weather-resistant vinyl cover 2 provided on its inner surface with a pressure sensitive adhesive. For esthetic purposes, cover 2 may be imprinted with various attractive designs or be of simulated wood grain. Decals to simulate a miniature house may be applied to cover 2.

End walls of the birdhouse are indicated at 3 and 4 each being of circular configuration and each having a lip portion at 5 and 6 respectively. With attention to FIG. 4, it will be seen that each lip portion typically is shouldered as at 5A to retentively engage a rim or bead 1A of cylindrical structure 1. End walls 3 and 4 are constructed from durable, pliable synthetic plastic to provide pliable rims 5 and 6 to enable snapped engagement about the end rims 1A-1B of structure 1.

With particular attention to end wall member 3, the same is subjected to a punching operation resulting in the formation of lines of severence at 6 and 7. Severance line 6 forms a cut of keyhole shape in end member 3 while the severance lines at 7 define a support retainer strip 8. Subsequent to the punching operation, a perch at 10 is movable to a horizontal position perpendicular to the end wall. A perch fold line is indicated at 11. Retainer strip 8 has fold lines at 12, 13 and 14 which permit the strip to be flexed into right angular configuration (per FIG. 3) to enable the insertion of a perch support member 15 of rectangular shape.

For retention of perch 10 in perpendicular relationship to integral end wall 3, fastening means such as an adhesive at 16 and 17 is applied. The fastening means may take other forms such as a small brad or staple driven through the perch or retainer strip 8 and into support block 15.

With attention now to the remaining end wall member 4, as shown in FIG. 5, the same may be provided with horizontal lines of severance terminating in upwardly directed cuts to enable the formation of louvers 20 and vent openings 21. Fold lines 22 permit the outward displacement of the louver components to protect the birdhouse interior from the elements. A drain opening at 23 permits the escape of condensation.

In FIG. 6 we show a pliable plastic strap at 25 having enlarged, pointed ends 26 each end being insertable through an end wall opening as at 27. The arrowhead shaped ends 26 flex laterally or outwardly after insertion through end wall openings at 27 to prevent their extraction and thereby enable strap 25 to support the weight of the birdhouse.

An alternative method for support of the birdhouse entails the securing of the end wall 4 to a vertical surface whereupon the rear rim 1B of structure 1 is inserted and retained within the stationary end wall.

While we have shown but one embodiment of the invention it will be apparent to those skilled in the art that the invention may be embodied still otherwise without departing from the spirit and scope of the invention.

Having thus described the invention, what is desired to be secured under a Letters Patent is:

1. In a birdhouse of cylindrical shape closed by circular end walls, the improvement comprising,
an end wall of flexible construction, a perch struck from said end wall and projecting outwardly therefrom along a fold line,
a perch support member subjacent the perch and in abutment with the end wall,
retainer means for said support member also struck from said end wall, and
said retainer means comprising a strip integral at its opposite ends with the end wall and said perch.

2. The invention claimed in claim 1 additionally including fastening means securing said perch support member in place below said perch.

3. The invention claimed in claim 1 additionally including a strap having enlarged ends for inserted locking engagement with openings in the birdhouse end walls.

* * * * *